Jan. 26, 1971        H. V. SCHWANDT        3,557,641
DOWEL HOLE DRILLING AND SPACING DEVICE
Filed Sept. 12, 1968

INVENTOR
HOWARD V. SCHWANDT

BY *Michael W. York*
ATTORNEY

United States Patent Office 3,557,641
Patented Jan. 26, 1971

3,557,641
DOWEL HOLE DRILLING AND
SPACING DEVICE
Howard V. Schwandt, P.O. Box 61, 402 S. Broad,
Weston, Oreg. 97886
Filed Sept. 12, 1968, Ser. No. 759,469
Int. Cl. B23b 47/28
U.S. Cl. 77—63                                    7 Claims

ABSTRACT OF THE DISCLOSURE

A dowel hole drilling and spacing device in which one drilled dowel hole is used to position the work piece in the path of a drill so that another dowel hole can be drilled at a preselected distance from the previously drilled hole. This device also has means for securing and holding the work piece in the path of the drill and for holding the work piece on the spacing device. This device can also incorporate a positioning system that allows the work piece to be positioned at a variety of angular relationships with respect to the long axis of the drill bit. With this device it is possible to rapidly position and drill numerous dowel holes in a work piece.

---

This invention relates to dowel hole drilling and spacing devices and more particularly to an improved device for positioning a work piece so that dowel holes can be drilled at preselected distances from each other. This invention provides a device that allows the work piece to be rapidly positioned for accurate dowel hole drilling.

One of the most effective means for joining such materials such as boards of wood together has been through the use of dowels. These dowels are pins that are usually round that fit into corresponding holes in two adjacent pieces to prevent slipping and to align and hold the pieces together. These dowels are usually glued or cemented to the corresponding pieces that they are joining so as to form a firm bond between these pieces. This method of joining two pieces together has many advantages and provides a very strong bond between the joined pieces. Due to these advantages this method of joining has found widespread use. One such use has been in the manufacture of furniture. The use of dowels in joining furniture parts also offers the additional advantage of providing a method of joining such parts together where through the use of blind dowel holes there is no external appearance of the joining means on the furniture.

A disadvantage that has previously been encountered when using the dowel joining method is that accurate and sometimes close positioning of the dowel holes is necessary to produce a joint having adequate strength. This accurate and close spacing of the dowel holes has been difficult to achieve. Such accurate and close spacing has been particularly difficult where the joining of relatively thin pieces has been required. In these instances adequate strength requires close and accurate spacing of the dowels in the pieces. Such positioning of dowel holes for these dowels at close intervals is difficult to achieve by conventional means. With the device of this invention the problems associated with the accurate and close machining of dowel holes are greatly aleviated.

It is an object of this invention to provide a device for positioning and holding a work piece so that dowel holes can be drilled in the work piece at a preselected distance from each other.

Another object of this invention is to provide a device that permits the accurate machining of dowel holes.

Another object of this invention is to provide a device that permits the rapid positioning and drilling of dowel holes.

Another object of this invention is to provide a device that permits the close spacing of drilled dowel holes in a work piece.

A further object of this invention is to provide a device that is capable of holding a work piece at a variety of angles with respect to the long axis of the drill so that dowel holes can be drilled in a work piece at a variety of angles.

Additional objects and advantages of this invention will be readily apparent to those skilled in the art from the following detailed description of a preferred embodiment of this invention illustrated in the accompanying drawings, wherein.

Figure 1:
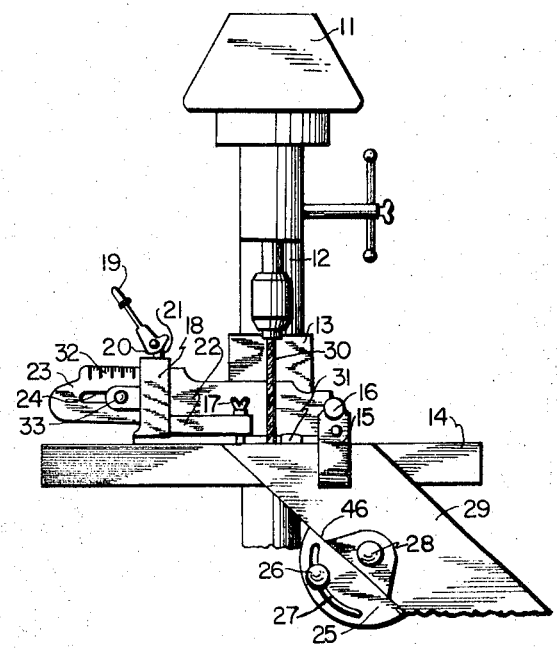
FIG. 1 is a front elevational view of the device of this invention attached to a drill press.
Figure 2:
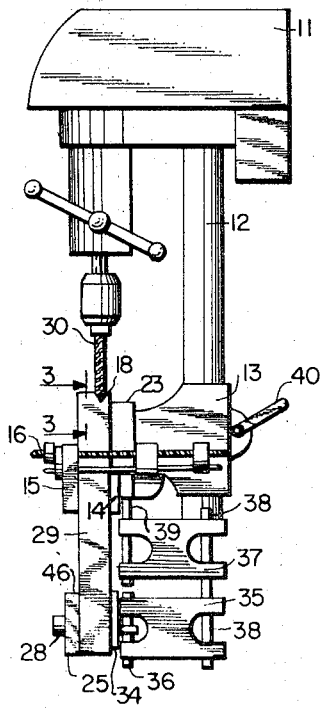
FIG. 2 is a side elevational view of the device of this invention attached to a drill press.

Referring now to FIG. 1 and FIG. 2 there is shown a drill press head 11 attached to a drill press post 12. Slidably mounted on the drill press post 12 is a support member 13 with a jaw 14. Connected to this support member 13 is a jaw 15 with an adjusting screw 16. A work piece 29 is shown secured by the jaws 14 and 15. This support member 13 and its associated jaws 14 and 15 can be similar to that described in United States Pat. No. 2,576,485. Attached to the support member 13 is a mounting member 23. This mounting member 23 has a foot 31 and a scale 32. Mounting member 23 has a dovetail slot 24 in which work locating body member 18 of this invention is capable of sliding. The work locating body member 18 also has a thumb screw 33 that secures the work locating body member 18 to mounting member 23 and prevents movement of the work locating body member 18 in the dovetail slot 24. Connected to the work locating body member 18 is a handle 19 having a camming surface 20. Connected to handle 19 is a vertical shaft 21 that fits through the work locating member 18 and is also attached to work locating extension member 22 that holds a cylindrical dowel hole locating pin 17.

Reference numeral 25 refers to a work piece positioning member of this invention. This work piece positioning member 25 fits against the side of the work piece 29 and is capable of being rotated so as to present the work piece 29 at a variety of angles with respect to the long axis of the drill 30. This work piece positioning member 25 has a slot 27 in which a thumb screw 26 travels and another thumb screw 28 that clamps the work piece 29 to the work piece positioning member 25. Thumb screw 26 can be tightened to lock the work piece positioning member 25 in place to prevent its rotation.

The details of the manner in which this work positioning member 25 is connected to the suport member 13 can be seen by referring to FIG. 2. The work positioning member 25 is rotatably mounted to backing plate member 34. The backing plate member 34 is rotatably connected to the forward end of lower holding member 35 by the vertical pin 36 in such a manner that the backing plate member 34 and the work positioning member 25 are free to rotate horizontally about vertical pin 36 for an arc of over 180 degrees. Lower holding member 35 is rotatably connected at its rearward end to the rearward end of an upper holding member 37 by the vertical pin 38 in such a manner that lower holding member 35 is free to rotate horizontally about vertical pin 38 for an arc of over 180 degrees. Upper holding member 37 is rotatably connected at its forward end to support member 13 by vertical pin 39 that is attached to support member 13 in such a manner that holding member 37 is free to rotate horizontally about vertical pin 39 for an arc of over 180 degrees. Support member 13 is slidably mounted to drill press post 12 and can be locked in place by tightening lever 40. This interconnection of positioning member 25, backing plate member 34, and holding members 35 and 37 allows the work piece 29 to be slid along and positioned at a variety of places along the face of the jaw 14 while the work piece 29 retains the same angular relationship with the long axis of the drill 30.

Figure 3:
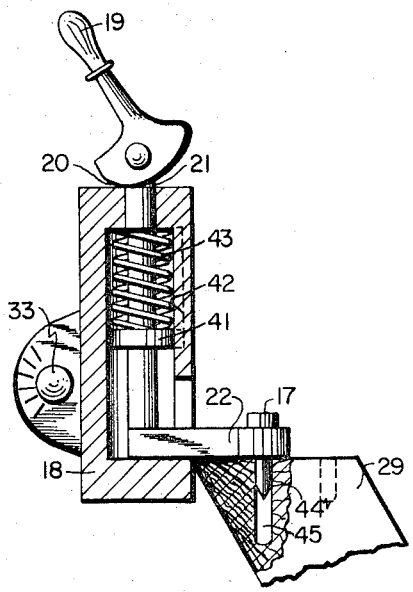
FIG. 3 is an enlarged sectional view of part of the structure shown in FIG. 1 and FIG. 2 taken along the line 3—3 of FIG. 2.

FIG. 3 shows an enlarged sectional view, of the work locating body member 18 and its associated parts. FIG. 3 shows the handle 19 with its camming surface 20 movably connected to the top of the shaft 21 that is attached to work locating extension member 22. Work locating extension member 22 that is connected to the lower end of the shaft 21 is also shown holding locating pin 17. Attached to shaft 21 is key member 41 that slides in key way 42. Around the shaft 21 is a spring 43 that pushes against the top of key member 41 and tends to hold work extension member 22 in the down position and to hold locating pin 17 in a previously drilled dowel hole 45 in work piece 29. This locating pin 17 has a tapered end 44 so that it can readily slide into the previously drilled dowel hole 45.

The device of this invention functions in the following manner. Work piece positioning member 25 is set at the desired angle and secured by tightening thumb screw 26. A work piece 29 such as a wood board is then placed with its narrow side against the face or surface 46 of the work piece positioning member 25. The work piece 29 is then secured to the work positioning member 25 and backing plate member 34 by tightening thumb screw 28. The work piece 29 is then slid along the face of jaw 14 to position the work piece under the drill 30. Thumb screw 16 is then tightened to secure the work piece 29 between jaws 14 and 15. A dowel hole 45 is then drilled in the work piece 29. The drill 30 is then withdrawn from the work piece 29 and the foot 31 keeps the work piece 29 from tending to rise as the drill 30 is withdrawn. Thumb screw 16 is then loosened thus permitting work piece 29 to be slid along the face of jaw 14. Handle 19 is then pushed down and this raises work locating extension member 22 and locating pin 17. The work piece 29 is then positioned so that the previously drilled dowel hole 45 is under the locating pin 17. The handle 19 is then released and the locating pin 17 is forced into the previously drilled dowel hole 45 by the action of spring 43 to position the work piece in the path of the drill so that the next drilled dowel hole will be located at a preselected distance from the previously drilled dowel hole. Thumb screw 16 is then tightened to cause the jaws 14 and 15 to secure the work piece in the path of the drill and to hold the work piece on the locating pin. Another dowel hole 45 is then drilled in the work piece 29. Thumb screw 16 is then loosened and handle 19 is again pushed down. Then the locating pin 17 is positioned into the last drilled dowel hole 45. This process is then repeated to produce as many dowel holes 45 as desired. These dowel holes 45 are located at a uniform distance from each other.

The distance between the holes is preselected by loosening the thumb screw 33 and moving work locating body member 18 in the dovetail slot 24. The distance between the dowel holes 45 with the work locating body member 18 at various positions can be read from scale 32 that is attached to mounting member 23. After the work locating body member 18 is positioned, the thumb screw 33 is tightened. When it is not desired to hold the work piece 29 for drilling at some particular angular relationship to the long axis of the drill 30, then the work piece 29 can merely be secured by means of the thumb screw 16 and the jaws 14 and 15 and the use of the work piece positioning member 25 is unnecessary.

Although the invention has been described in considerable detail with reference to certain preferred embodiments, it will be understood that variations and modifications may be made within the spirit and scope of the invention as defined in the appended claims.

What is claimed is:

1. A dowel hole drilling and spacing device comprising:
   (1) a support member adapted to be attached to a drill press;
   (2) locating means connected to said support member and insertable in a previously drilled dowel hole in a work piece for positioning said work piece in the path of a drill so that the next drilled dowel hole will be located at a preselected distance from said previously drilled dowel hole;
   (3) work piece holding means connected to said support member for securing said work piece in the path of said drill and for holding said work piece on said locating means; and
   (4) positioning means connected to said support member for positioning said work piece at a variety of angles with respect to the long axis of said drill.

2. The dowel hole drilling and spacing device of claim 1, wherein said positioning means comprises:
   (1) a backing plate member;
   (2) a positioning member rotatably connected to said backing plate member, said positioning member having a surface that is adapted to fit against an edge of said work piece; and
   (3) mounting means connected to said backing plate member and said support member for mounting said backing plate member to said support member.

3. The dowel hole drilling and spacing device of claim 2, wherein said mounting means comprises an upper holding member rotatably connected at its forward end to said support member so that said upper holding member is free to rotate horizontally and a lower holding member rotatably connected at its rearward end to the rearward end of said upper holding member so that said lower holding member is free to rotate horizontally, said lower holding member being rotatably connected at its forward end to said backing plate member so that said backing plate member is free to rotate horizontally.

4. A dowel hole drilling and spacing device comprising;
   (1) a support member adapted to be slidably mounted on and locked in place on a drill press post;
   (2) a work locating body member connected to said support member;
   (3) a vertical member movably mounted within said work locating body member;
   (4) a handle movably connected to the top of said vertical member, said handle having a camming surface resting against the top of said work locating body member for applying force to said vertical member to cause said vertical member to move in an upward direction;
   (5) an extension member connected to the lower end of said vertical member, said extension member having work locating means insertable in a previously drilled dowel hole in a work piece for positioning said work piece in the path of a drill so that the next drilled dowel hole will be located at a preselected distance from said previously drilled dowel hole; and (6) work piece holding means connected to said support member for securing said work piece in the path of said drill and for holding said work piece on said locating means.

5. The dowel hole drilling and spacing device of claim 4, including means for slidably mounting said work locating body member to said support member.

6. The dowel hole drilling and spacing device of claim 4, wherein said locating means comprises a cylindrical pin. and said work locating body member to bias said vertical member in a downward direction.

7. The dowel hole drilling and spacing device of claim wherein said locating means comprises a cylindrical pin.

References Cited
UNITED STATES PATENTS

| | | | |
|---|---|---|---|
| 2,783,665 | 3/1957 | Saunders | 77—62 |
| 2,612,793 | 10/1952 | Timpner | 77—65 |

FRANCIS S. HUSAR, Primary Examiner

U.S. Cl. X.R.

77—55, 62